United States Patent [19]

Ruback et al.

[11] Patent Number: 4,830,771

[45] Date of Patent: May 16, 1989

[54] PROCESS FOR THE PREPARATION OF TRIALKANOLAMINE DI(FATTY ACID) ESTERS, AND THE USE THEREOF FOR SOFTENING FABRICS

[75] Inventors: Wulf Ruback, Recklinghausen, Fed. Rep. of Germany; Jan Schut, Delden, Netherlands

[73] Assignee: Huels Aktiengesellschaft, Marl, Fed. Rep. of Germany

[21] Appl. No.: 208,054

[22] Filed: Jun. 17, 1988

[30] Foreign Application Priority Data

Jun. 19, 1987 [DE] Fed. Rep. of Germany ....... 3720332

[51] Int. Cl.[4] ........................ C08F 5/00; C08F 7/00; C11C 3/00

[52] U.S. Cl. .................................. 252/8.8; 252/8.6; 260/404; 260/410.6; 260/410.7

[58] Field of Search ....................... 252/8.8; 260/404

[56] References Cited

U.S. PATENT DOCUMENTS

| | | | |
|---|---|---|---|
| 2,173,058 | 9/1939 | Kritchevsky | 260/404 |
| 2,228,985 | 1/1941 | de Groote et al. | 260/404 |
| 3,915,867 | 10/1975 | Kang et al. | 252/8.8 |
| 4,136,054 | 1/1979 | Petzold et al. | 252/8.8 |
| 4,456,554 | 6/1984 | Walz et al. | 260/403 |

FOREIGN PATENT DOCUMENTS 159263 3/1983 German Democratic Rep. .

*Primary Examiner*—A. Lionel Clingman

*Attorney, Agent, or Firm*—Oblon, Fisher, Spivak, McClelland & Maier

[57] ABSTRACT

A process for the preparation of trialkanolamine di(-fatty acid) esters in which a trialkanolamine is reacted with a fatty acid in the presence of small amounts of a fatty acid ester.

The trialkanolamine fatty acid diesters obtained can be converted into the quaternary ammonium salt by means of standard quaternizing agents, and the resulting products can be employed as fabric conditioners.

14 Claims, No Drawings

PROCESS FOR THE PREPARATION OF TRIALKANOLAMINE DI(FATTY ACID) ESTERS, AND THE USE THEREOF FOR SOFTENING FABRICS

BACKGROUND OF THE INVENTION

1. Field of the Invention

This invention is related to a process for the preparation of trialkanolamine di(fatty acid) esters, and the use thereof. The trialkanolamine di(fatty acid) esters prepared in accordance with the process of the invention are intended for use as fabric conditioners, after quaternization.

2. Discussion of the Background

The preparation of fatty acid esters and trialkanolamine fatty acid esters is well known. The esterification catalysts employed are, inter alia, alkali metal hydroxides, mineral acids, Lewis acids, etc. Quaternized trialkanolamine di(fatty acid) esters are commonly employed as components in fabric conditioners.

In the reaction of about two equivalents of fatty acid with a trialkanolamine, quantities of the corresponding monoester and triester are obtained in addition to the desired trialkanolamine di(fatty acid) ester as the major component due to the existing thermodynamic equilibrium. This thermodynamic mixture is referred to below as the trialkanolamine di(fatty acid) ester.

If the esterification of the trialkanolamines is carried out using about two equivalents of fatty acid in the presence of the above-mentioned known esterification catalysts, quaternary ammonium compounds (for example, N-methyltriethanolammonium di(tallow fatty acid) ester methylsulphate), are obtained after quaternization using, for example, dimethyl sulphate, which exhibit properties which are undesirable in a raw material for fabric conditioners. When the products are diluted to a solids content of 85 to 90% by weight using water and lower alcohols, such as isopropyl alcohol, the resulting mixtures are not free-flowing, i.e. are too solid. Additionally, the mixtures tend to form crystals extensively.

U.S. Pat. No. 3,915,867 teaches the preparation of triethanolamine di(fatty acid) esters by reacting triethanolamine with fatty acid methyl esters. Although the quaternary ammonium compounds prepared therefrom exhibit the desired free-flowing quality after dilution to a solids content of 85 to 90% by weight using water and isopropanol, other problems arise in this case.

The 85% by weight end product comprises a relatively thin melt containing crystallites. The crystallites deposit within a rather short time when the mixture is left to stand. The processability is thereby impaired, and it is even possible for variations in the quality of the fabric conditioners produced therefrom to occur.

In addition, it should be noted that the methyl esters employed must be prepared in an additional step and so, compared to unesterified fatty acids, their use is thus considerably more expensive.

SUMMARY OF THE INVENTION

Accordingly, one object of this invention is to provide a novel method of preparing trialkanolamine di(fatty acid) esters which can be carried out at comparatively low expense.

Another object of this invention is to provide a novel method of preparing quaternized trialkanolamine di(fatty acid) esters which results in free-flowing products when in highly concentrated form (85-90% by wt.).

Another object of this invention is to provide a novel method for preparing quaternized trialkanolamine di(fatty acid) esters which have no tendency towards deposition in a highly concentrated form (85-90% by wt.).

These and other objects which will become apparent from the following specification have been achieved by the present process for the preparation of trialkanolamine di(fatty acid) esters, comprising: reacting a trialkanolamine of the following formula:

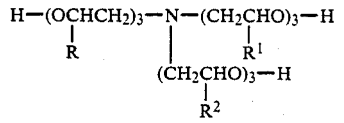

in which R, $R^1$, and $R^2$ are identical or different and are selected from the group consisting of hydrogen and $C_{1-6}$ alkyl radicals, with 1.5 to 2.5 equivalents of a $C_{8-24}$ fatty acid, in the presence of from 0.05 to 5.0% by weight, relative to the total mixture, of a fatty acid ester.

DETAILED DESCRIPTION OF THE PREFERRED EMBODIMENTS

The present invention is a process for the preparation of trialkanolamine di(fatty acid) esters which comprises reacting a trialkanolamine with 1.5 to 2.5, preferably 1.8 to 2.2, and more preferably 1.9 to 2.1 equivalents of a fatty acid in the presence of from 0.05 to 5.0, preferably 0.1 to 2.0, and more preferably 0.2 to 1.0% by weight, relative to the total mixture, of a fatty acid ester.

Suitable trialkanolamines which can be reacted according to the invention are those which correspond to the following formula:

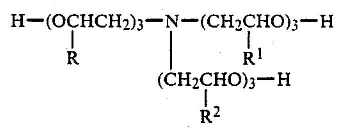

in which R, $R^1$, and $R^2$ are identical or different and are selected from the group consisting of hydrogen and $C_{1-6}$ alkyl radicals. In a preferred embodiment of the invention R, $R^1$, and $R^2$ are identical or different and are selected from the group consisting of hydrogen and $C_{1-4}$ alkyl radicals. In another preferred embodiment of the invention R, $R^1$, and $R^2$ may be identical or different and are selected from the group consisting of hydrogen and methyl. In a more preferred embodiment of the invention, R, $R^1$, and $R^2$ are hydrogen.

Examples of suitable trialkanolamines are triethanolamine, triisopropanolamine, triisobutanolamine, triisopentanolamine, triisohexanolamine, diethanolmonoisopropanolamine, monoethanoldiisopropanolamine, monoethanoldiisobutanolamine and their analogues.

The fatty acids which are reacted with the trialkanolamines are generally those having 8 to 24, preferably 12 to 22, and more preferably 16 to 20 carbon atoms in a linear or branched alkyl or alkene chain.

Examples of suitable fatty acids are caprylic acid, capric acid, lauric acid, myristic acid, palmitic acid, stearic acid, arachidic acid, behenic acid, and the branched or unsaturated homologues thereof (oleic acid, for example).

The fatty acid esters present in the reaction of the fatty acids with the trialkanolamines are derived, for example, from linear or branched saturated or unsaturated fatty acids having 4 to 24, preferably 8 to 22, and more preferably 10 to 20 carbon atoms.

Suitable examples of fatty acids from which the fatty acid esters may be derived are butyric acid, valeric acid, caproic acid, caprylic acid, capric acid, lauric acid, myristic acid, palmitic acid, stearic acid, arachidic acid, behenic acid, and lignoceric acid, and the branched isomers thereof (isovaleric acid, for example), or the unsaturated isomers thereof (for example, oleic acid).

Suitable alcohols from which the fatty acid esters may be derived have 1 to 8, preferably 1 to 6, and more preferably 1 to 3 carbon atoms. They may be monohydric to hexahydric, and are preferably monohydric to trihydric alcohols.

Examples of suitable alcohols from which the fatty acid esters may be derived are methanol, ethanol, propanol, isopropanol, butanol, isobutanol, pentanol, isopentanol, hexanol, isohexanol, heptanol, octanol, 2-ethylhexanol, ethylene glycol, propane 1,2-diol, propane 1,3-diol, butylene 1,2-glycol, butane 1,4-diol, pentane diols, hexane diols, heptane diols, octane diols, glycerol, butane triols, pentane triols, hexane triols, octane triols, erythritol, pentaerythritol, pentitols, and hexitols such as sorbitol, mannitol and dulcitol. The alcohol portion of the fatty acid esters is preferably chosen from methanol, ethanol or glycerol.

Suitable examples of fatty acid esters which can be employed are the methyl, ethyl, propyl, isopropyl, butyl, pentyl and hexyl esters of the above-mentioned fatty acids having 4 to 24 carbon atoms. The esters are preferably of naturally occurring fatty acid mixtures, such as tallow fatty acid methyl ester or ethyl ester, coconut fatty acid methyl ester or ethyl ester, and palm oil fatty acid methyl ester or ethyl ester. Particularly preferable are the naturally occurring glycerol esters of fatty acids or fatty acid mixtures, such as tripalmitin, tristearin, tallow fat, coconut fat, and palm oil. It is also possible to use partial esters of polyhydric alcohols such as glycerol monostearate, glycerol distearate, sorbitol monolaurate, sorbitol distearate, etc.

It is not necessary for the fatty acid esters employed in the esterification reaction to have the same number of carbons in the acyl part as the fatty acids intended for the esterification.

The trialkanolamine di(fatty acid) esters prepared according to the present invention can be employed as fabric softening agents, after a customary quaternisation reaction.

Suitable quaternizing reagents include dialkyl sulfates, trialkyl phosphates, and alkyl halides. Preferred dialkyl sulfates include dimethyl sulfate and diethyl sulfate; preferred alkyl halides include methyl chloride, ethyl chloride, methyl bromide, and ethyl bromide; and preferred trialkyl phosphates include trimethyl phosphate and triethyl phosphate.

The pressure and temperature conditions employed in the esterification reaction are the same as when known esterification catalysts are used. For example, the temperature may be 30° to 300° C., and is preferably 170° to 220° C.; the pressure may be 3 to 3,000 mbar, and is preferably 700 to 1,100 mbar. It is also possible to use elevated temperatures and pressures, but this is generally not necessary.

The examples which follow serve to further illustrate the invention and are not to be considered limiting thereof.

EXAMPLES

Example 1

552 g (2 mol) of tallow fatty acid (for example EDENOR® Ti from Henkel KGaA) is initially introduced in the molten state and warmed to 90° C. and 4 g (0.56% by weight of the total esterification mixture) of tallow fatty acid methyl ester (for example EDENOR ME/Ti from Henkel KGaA) is added. After the mixture has been stirred for 15 minutes, 156 g (1.05 mol) of triethanolamine is added, and the reaction mixture is subsequently warmed to 195° C. and stirred further at this temperature until an acid number of $\leqq 1$ mg of KOH/g has been reached. This occurs after about 3 hours, with 36 g of water distilling off.

The mixture is subsequently cooled to 90° C. and quaternized over a 30 minute period using 124.7 g (0.99 mol) of dimethyl sulphate. The product is then adjusted to a solids content of 85% using 140.6 g of ispropyl alcohol and bleached using 20 g (2.5%) of 30% strength hydrogen peroxide solution.

A virtually colorless, free-flowing product is obtained which is distinguished by good processability. In order to achieve this pale color, oxygen should be excluded from the reaction vessel during the entire duration of the reaction. It is appropriate to pass through about 30 L/h of nitrogen.

After standing for 6 months at room temperature, it was not possible to observe any separation phenomena. The product remained free-flowing.

Example 2

The procedure as described in Example 1 is followed with the exception that the tallow fatty acid methyl ester is replaced by 6 g of coconut fat (i.e. glycerol tri(coconut fatty acid) ester). The resulting product is just as free-flowing as that prepared in accordance with Example 1.

Example 3

The procedure as described under Example 1 is followed with the exception that the tallow fatty acid methyl ester is replaced by 5 g of ethyl oleate. A product is obtained which is comparable in its properties to that prepared in accordance with Example 1.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for the preparation of trialkanolamine di(fatty acid) esters, comprising: reacting a trialkanolamine of the following formula:

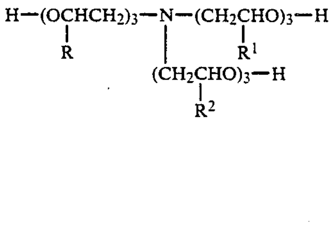

in which R, $R^1$, and $R^2$ are identical or different and are selected from the group consisting of hydrogen and $C_{1-6}$ alkyl radicals, with 1.5 to 2.5 equivalents of a $C_{8-24}$ fatty acid, in the presence of from 0.05 to 5.0% by weight, relative to the total mixture, of a fatty acid ester.

2. The process according to claim 1, wherein the fatty acid portion of said fatty acid ester comprises 4 to 24 carbon atoms.

3. The process according to claim 1, wherein the alcohol portion of said fatty acid ester is selected from monohydric to hexahydric alcohols having 1 to 8 carbon atoms.

4. The process according to claim 2, wherein the alcohol portion of said fatty acid ester is a monohydric to hexahydric alcohol having 1 to 8 carbon atoms.

5. A trialkanolamine di(fatty acid) ester composition obtained by reacting a trialkanolamine of the formula:

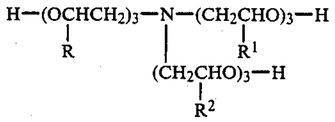

in which R, $R^1$, and $R^2$ are identical or different and are selected from the group consisting of hydrogen and $C_{1-6}$ alkyl radicals, with 1.5 to 2.5 equivalents of a $C_{8-24}$ fatty acid, in the presence of from 0.05 to 5.0% by weight, relative to the total mixture, of a fatty acid ester.

6. The composition according to claim 5, wherein the fatty acid portion of said fatty acid ester is selected from fatty acids containing 4 to 24 carbon atoms.

7. The composition according to claim 5, wherein the alcohol portion of said fatty acid ester is selected from monohydric to hexahydric alcohols having 1 to 8 carbon atoms.

8. A method of softening fabric, comprising: contacting the fabric with an amount of a quaternized trialkanolamine di(fatty acid) ester composition sufficient to soften said fabric, wherein said quaternized trialkanolamine di(fatty acid) ester composition is prepared by the steps comprising, reacting a trialkanolamine of the formula:

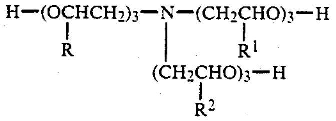

in which R, $R^1$, and $R^2$ are identical or different and are selected from the group consisting of hydrogen and $C_{1-6}$ alkyl radicals, with 1.5 to 2.5 equivalents of a $C_{8-24}$ fatty acid, in the presence of from 0.05 to 5.0% by weight, relative to the total mixture, of a fatty acid ester; quaternizing the resulting product; adjusting the quaternized product to a solids content of about 85–90% using a diluent.

9. A method according to claim 8, wherein the fatty acid portion of said fatty acid ester is selected from fatty acids containing 4 to 24 carbon atoms.

10. A method according to claim 8, wherein the alcohol portion of said fatty acid ester is selected from monohydric to hexahydric alcohols having 1 to 8 carbon atoms.

11. A method according to claim 8, wherein said quaternizing is carried out using a quaternizing reagent selected from the group consisting of dialkysulfates, trialkylphosphates and alkylkalides.

12. A method according to claim 11 wherein said quaternizing is carried out using a quaternizing reagent selected from the group consisting of dimethyl sulfate, diethyl sulfate, methyl chloride, ethyl chloride, methyl bromide, ethyl bromide, trimethyl phosphate, and triethyl phosphate.

13. A method according to claim 8, wherein the diluent is isopropyl alcohol.

14. The method according to claim 8, further comprising the step of bleaching the quaternized product.

* * * * *